(12) United States Patent
Soehnlen et al.

(10) Patent No.: US 9,498,906 B1
(45) Date of Patent: Nov. 22, 2016

(54) MOLD CLOSING ASSEMBLY

(71) Applicants: Gregory M. Soehnlen, North Canton, OH (US); Daniel P. Soehnlen, Canton, OH (US); William R. Soehnlen, Uniontown, OH (US)

(72) Inventors: Gregory M. Soehnlen, North Canton, OH (US); Daniel P. Soehnlen, Canton, OH (US); William R. Soehnlen, Uniontown, OH (US)

(73) Assignee: CREATIVE EDGE DESIGN GROUP LTD., Canton, OH (US)

( * ) Notice: Subject to any disclaimer, the term of this patent is extended or adjusted under 35 U.S.C. 154(b) by 0 days.

(21) Appl. No.: 14/151,274

(22) Filed: Jan. 9, 2014

Related U.S. Application Data (60) Provisional application No. 61/750,414, filed on Jan. 9, 2013.

(51) Int. Cl.
| | | |
|---|---|---|
| *B29C 45/40* | (2006.01) | |
| *B29C 45/00* | (2006.01) | |
| *B29C 65/00* | (2006.01) | |

(52) U.S. Cl.
CPC ......... *B29C 45/0081* (2013.01); *B29C 66/549* (2013.01)

(58) Field of Classification Search
CPC ................ B29C 45/0081; B29C 45/42; B29C 66/549
See application file for complete search history.

(56) References Cited

U.S. PATENT DOCUMENTS

| | | | | |
|---|---|---|---|---|
| 3,537,676 | A * | 11/1970 | Miller ............................. | 249/59 |
| 4,040,595 | A * | 8/1977 | Tecco ............................. | 249/68 |
| 4,340,352 | A * | 7/1982 | Hayberg ........................ | 425/517 |
| 4,351,630 | A * | 9/1982 | Hayberg et al. .............. | 425/517 |
| 4,610,621 | A * | 9/1986 | Taber et al. ................... | 425/577 |
| 5,295,802 | A * | 3/1994 | Hersbt .......................... | 425/139 |
| 5,798,074 | A * | 8/1998 | McCready .......... | B29C 45/2681 249/59 |
| 6,305,563 | B1 * | 10/2001 | Elliott .......................... | 215/235 |
| 2004/0084809 | A1 * | 5/2004 | Vanderploeg et al. ....... | 264/334 |
| 2006/0151909 | A1 * | 7/2006 | Kalemba et al. ............. | 264/242 |
| 2011/0168661 | A1 | 7/2011 | Soehnlen et al. | |

\* cited by examiner

*Primary Examiner* — Jill Heitbrink
(74) *Attorney, Agent, or Firm* — Fay Sharpe LLP (57) ABSTRACT

A mold head assembly and associated method maintains a lid in a closed position relative to a cap body while a molded cap assembly is removed from a threaded core in a mold cavity. The mold head assembly includes a first member, a second member configured for receipt opposite the associated mold cap assembly and mounted to the first member for limited relative movement therebetween, and a biasing member interposed between the first and second members for urging the second member toward the mold cavity. Particularly, a compliant head assembly engages the molded cap or lid and biasing springs urge a plate, the lid, and the cap base toward the mold cavity in a direction generally opposite that of the motion of a stripping sleeve relative to a thread core.

8 Claims, 10 Drawing Sheets

MOLD CLOSING ASSEMBLY

This application claims the priority benefit of U.S. provisional application Ser. No. 61/750,414, filed Jan. 9, 2013, the disclosure of which is expressly incorporated herein by reference.

BACKGROUND

This disclosure is directed to a mold assembly, and particularly a closing assembly for molded components formed therein. The disclosure finds particular application in the manufacture of injection molded, hinged components such as hinged caps or assemblies that are generally known in the art, although it may find application in related uses.

Commonly owned US published application US 2011/0168661 is directed to a hinged cap assembly or flip cap assembly commonly used to selectively close and dispense contents from a fluid bottle or container. The disclosure of the US 2011/0168661 application is expressly incorporated herein by reference. These types of cap assemblies are typically formed of a molded plastic such as a high density polyethylene. The cap is subsequently assembled, e.g., threaded, on to a separately molded bottle. More specifically, the hinged cap assembly includes a lid hinged to a body or base member that preferably includes thread portions for threaded receipt on the corresponding threads of the bottle. By opening the lid, access is provided to a removable panel portion in the body. The panel portion is removed and the contents may be poured from the bottle. Once dispensing is complete, the lid is closed over opening in the base by pivoting the lid along the hinge. In this manner, the opening in the cap is effectively sealed by the lid.

Known equipment injection molds the cap assembly in a cavity in a manner where the base and the lid are removed from the mold cavity in an open position. That is, the lid and base of the cap assembly are usually disposed in hinged, side-by-side relation. The cap assembly is transferred to additional equipment such as a robot which folds the lid to a closed position relative to the base. The integrally molded hinge allows the lid to be pivoted about the hinge axis to a closed position where the lid snap fits to the base of the cap assembly. As will be appreciated, the additional equipment required to close the cap assembly after removal from the mold is quite expensive. The system also requires additional handling of the cap assembly, e.g., an intermediate transfer from the injection mold cavity, to the cap closure equipment, and subsequently to installation on the bottle.

A primary reason for using additional equipment to close the cap assembly is due to the fact that a thread or thread portion is integrally formed in the cap base. This requires the base of the cap assembly to be stripped, i.e. forcibly removed in an axial direction, over the thread core. This stripping action distorts the shape of the base of the cap assembly and therefore precludes closing of the lid prior to removal from the mold cavity.

In other instances, the base of the cap assembly can be removed from the thread core by rotating the cap assembly relative to the core. This presents additional challenges and expense.

The cost of separate equipment, additional handling, maintenance, etc. leads to a desire to simplify the method of manufacture and the associated equipment used to manufacture hinged cap assemblies, for example.

SUMMARY

A mold head assembly maintains a lid in a closed position relative to a body while a molded cap assembly is removed from a threaded core. The mold head assembly includes a first member configured for receipt opposite the associated mold cap assembly. A second member is mounted to the first member for limited relative movement. A biasing member is interposed between the first and second members for urging the first member toward a mold cavity.

In one embodiment, a biasing member includes individual spaced apart springs.

Each spring is received around a respective pin.

The pins are secured to the first member adjacent first ends and each pin includes a stop member adjacent a second end for selective abutting engagement with the second member.

The pins extend through the second member and the springs are interposed between the first and second members.

A roller is rotatably secured to the second member and is dimensioned and configured to roll across the surface of the associated molded cap assembly.

A stripping sleeve is received over the thread core for selective axial movement relative thereto and for stripping the associated cap assembly from the core pin.

A method of making a molded, threaded cap assembly includes molding a cap assembly to form a body and a lid joined together along hinge. While in the mold cavity, the method further includes closing the lid on the body. The method includes subsequently stripping the cap assembly from a thread core with the lid closed on the body.

The stripping step includes urging the lid toward the closed position during removal of the body over the threads of the thread core.

The stripping step includes advancing the body over a threaded portion of the core.

The stripping step includes imposing a closing force on the lid during the body advancing step.

The method includes directing the lid closing force in an opposite axial direction from the body advancing step.

The method includes forming the body and lid in a substantially co-planar arrangement in the mold.

The closing force is preferably imposed on the lid and extends substantially diametrically across the lid.

The closing force is preferably initiated adjacent the hinge.

The closing force proceeds in a progressive manner from adjacent the hinge and across the lid.

One advantage of the present disclosure relates to the cost savings associated with additional equipment.

Still another benefit resides in the decreased cycle time between manufacture and assembly of the closed cap on a bottle.

Yet another benefit is found in the simplified structure to achieve closing of the cap assembly in the mold.

Still other benefits and advantages will become apparent to those skilled in the art upon reading and understanding the following detailed prescription.

DETAILED DESCRIPTION

Figure 1:
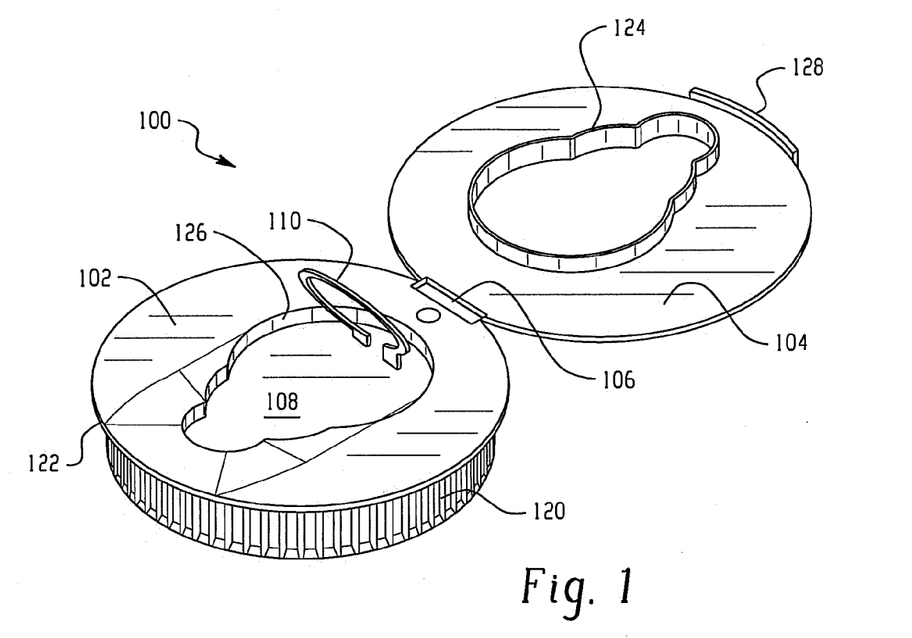
FIG. 1 is a top perspective view of a cap assembly in a lid open position.
Figure 2:
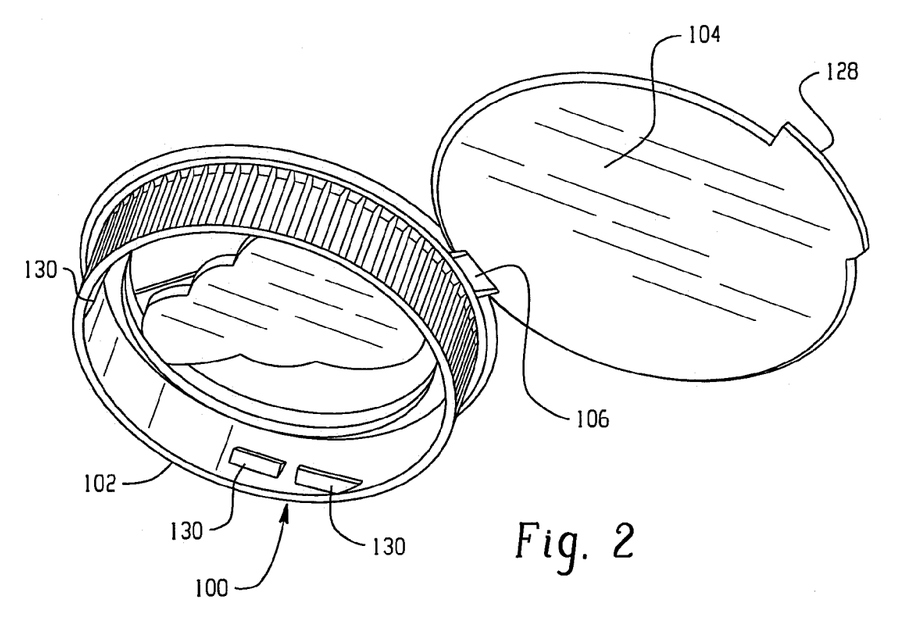
FIG. 2 is a bottom perspective view of the cap assembly of FIG. 1.

Turning first to FIGS. 1 and 2, cap assembly 100 is of the general type shown and described in commonly owned application US 2011/0168661. Since the disclosure of that application is incorporated by reference, not all of the details of the cap assembly are provided herein. Generally, the cap assembly 100 includes a base 102 and a lid 104 joined together by a hinge 106. The base 102 includes a tear-away or removable panel 108 and pull tab 110 is secured to the panel 108 to facilitate removal of the panel from the base. The base 102 includes a knurled perimeter 120, for example, formed by circumferentially spaced ribs and an upper rim 122. When the lid 104 is closed on to the base 102, a seal member 124 on an underside surface of the lid 104 is received in a similarly shaped recess 126 formed in an upper surface of the base. A closing member 128 also extends outwardly from the undersurface of the lid 104 for selective snap-fit engagement with the upper rim 122 of the base 102 at a region opposite the hinge 106 when the lid is closed on to the base.

An inner surface of the base 102 includes thread portions 130. As is known, the thread portions 130 cooperate with external threads of an associated bottle (not shown) that allow the cap assembly 100 to be secured to the bottle. Further details regarding the thread portions will be described below.

Figure 3:
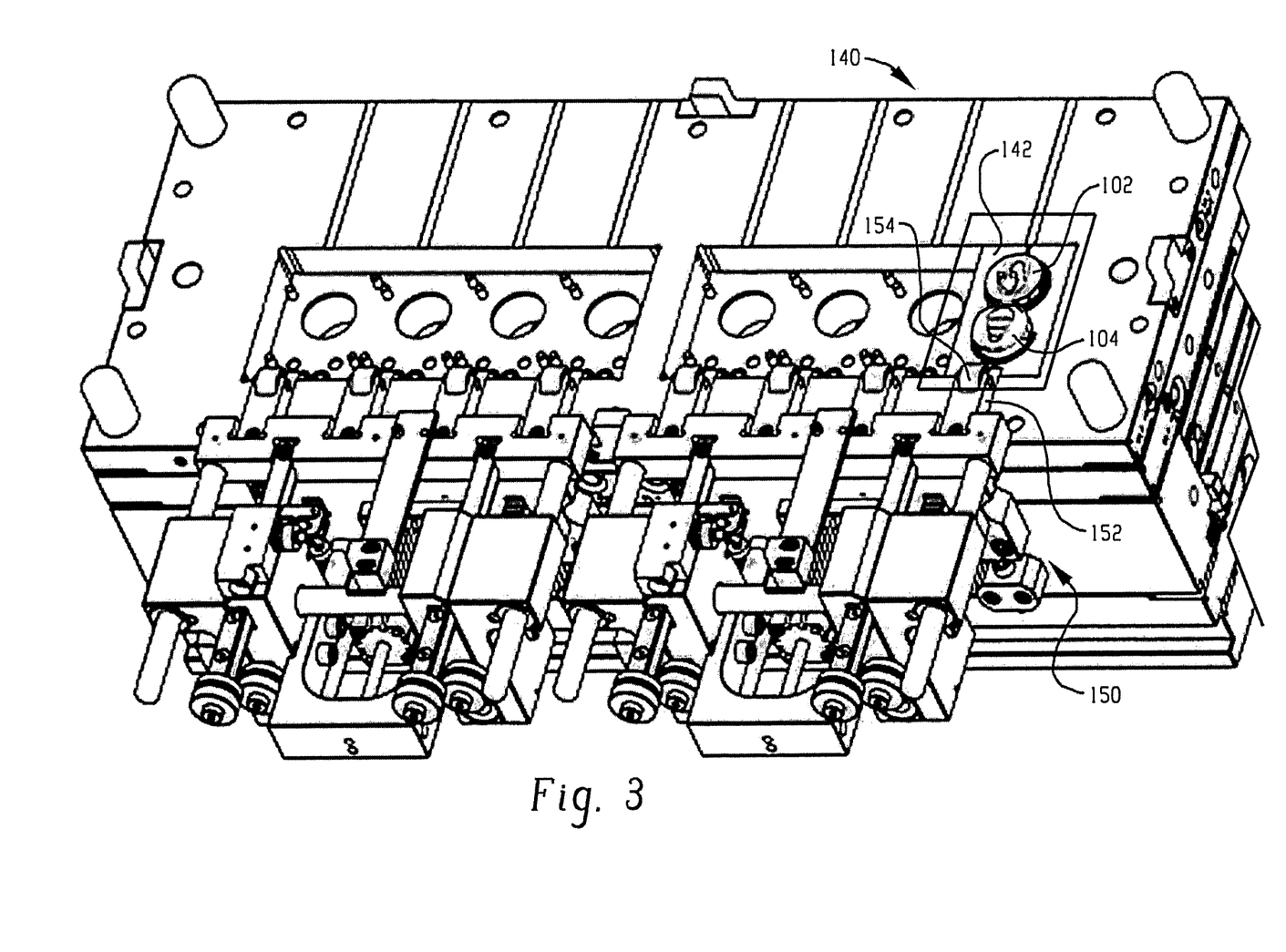
FIG. 3 is a perspective view of a multi-cavity mold assembly.
Figure 4:
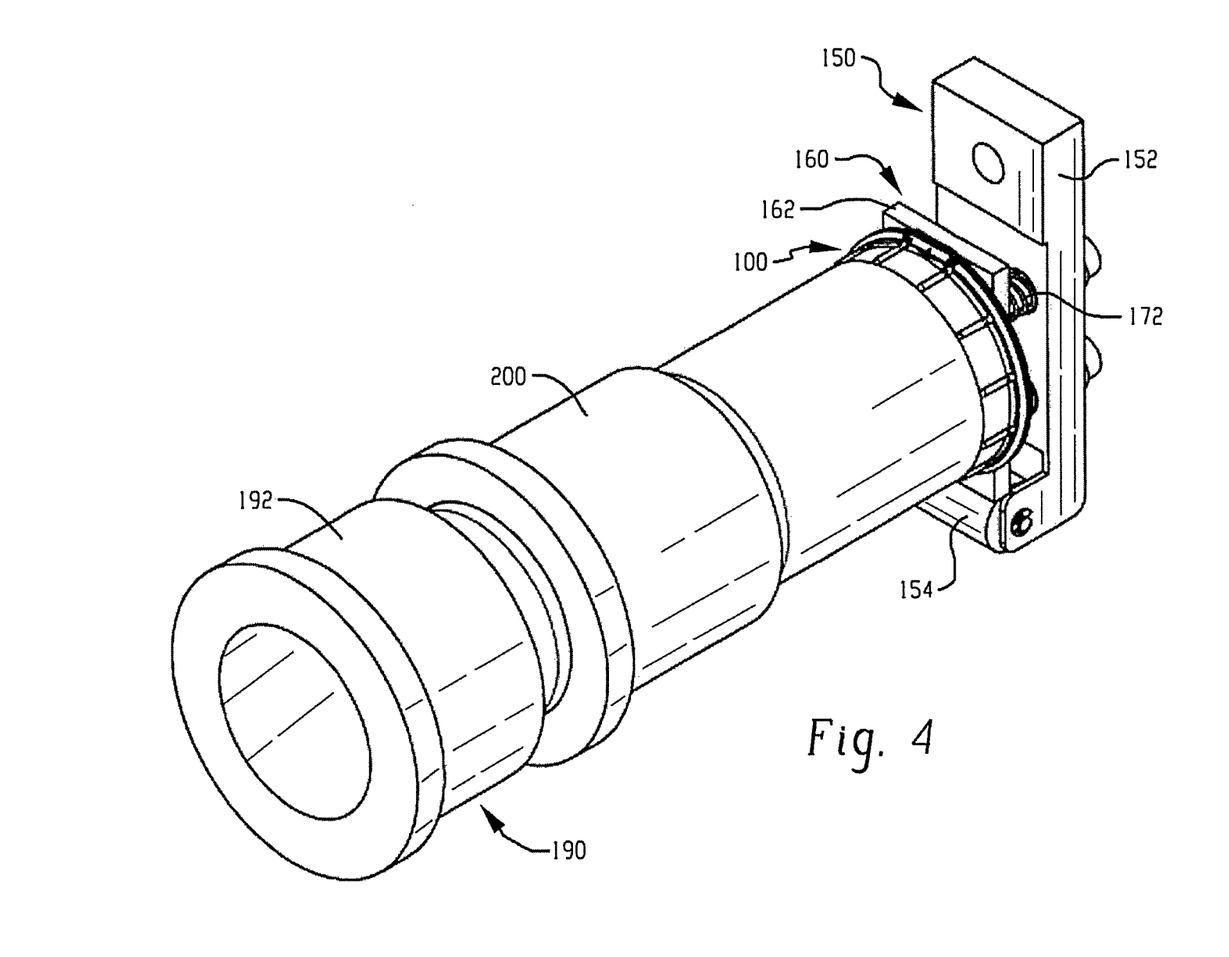
FIG. 4 is a perspective view of a thread core, stripping sleeve, cap assembly, and compliant head assembly.

The cap assembly 100 is shown in FIGS. 1 and 2 in substantially the form as it is molded in a mold cavity. For example, and with additional reference to FIG. 3, mold assembly 140 includes multiple mold cavities 142 of which only one is shown for ease of illustration. Thus, the base 102 and lid 104 are evident in FIG. 3 in one of the mold cavity locations. In addition, the mold assembly 140 includes an in-mold lid closing assembly 150. The closing assembly 150 includes a first member or arm 152 extending outwardly from the closing assembly toward the mold cavity 142. More particularly, an arm 152 is shown for each of the eight illustrated cavities, although only one of the cap assemblies 100 is shown in FIG. 3. One skilled in the art will appreciate, however, that the remaining seven mold cavities would be used to form seven additional cap assemblies. Likewise, the particular number of cavities in the mold may vary, i.e. may be greater or less than eight cavities, without departing from the scope and intent of the present disclosure.

Figure 5:
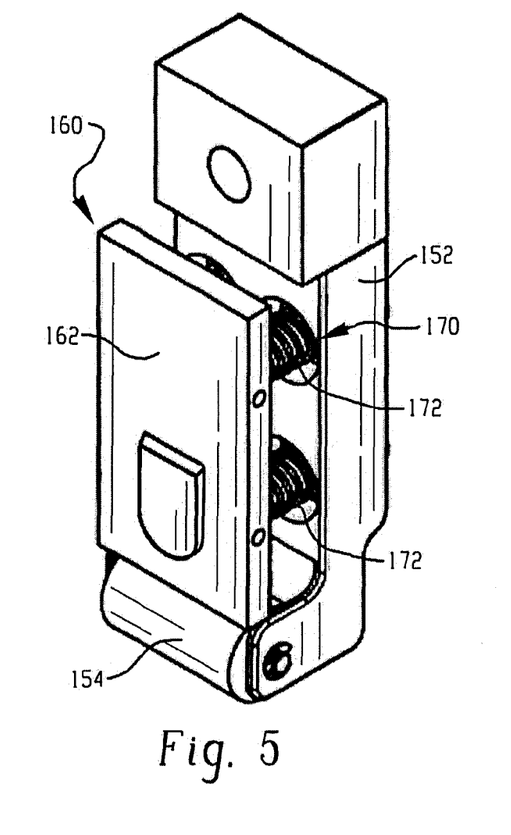
FIG. 5 is a perspective view of a compliant head assembly.
Figure 6:
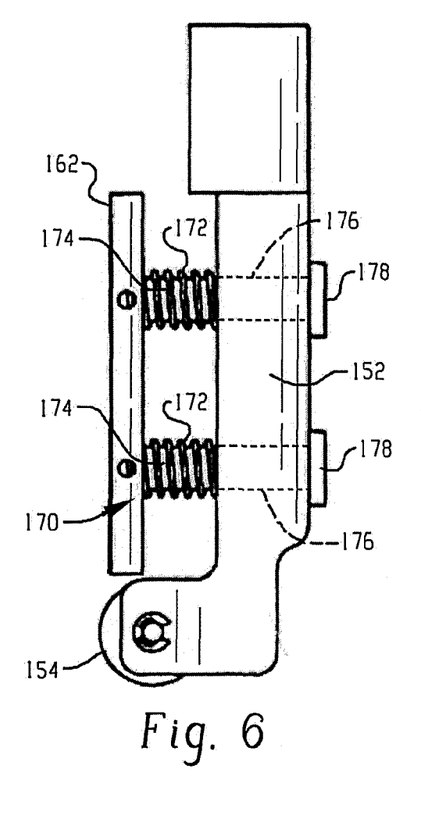
FIG. 6 is a side elevational view of the compliant head assembly.
Figure 7:
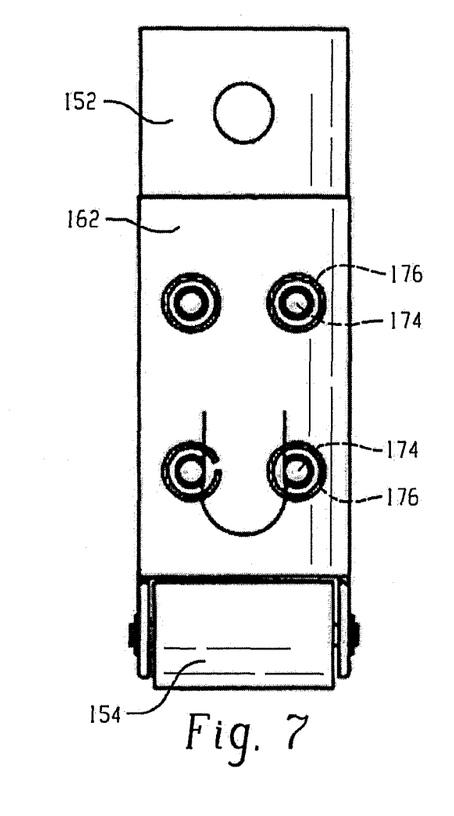
FIG. 7 is a front elevational view of the compliant head assembly.
Figure 8:
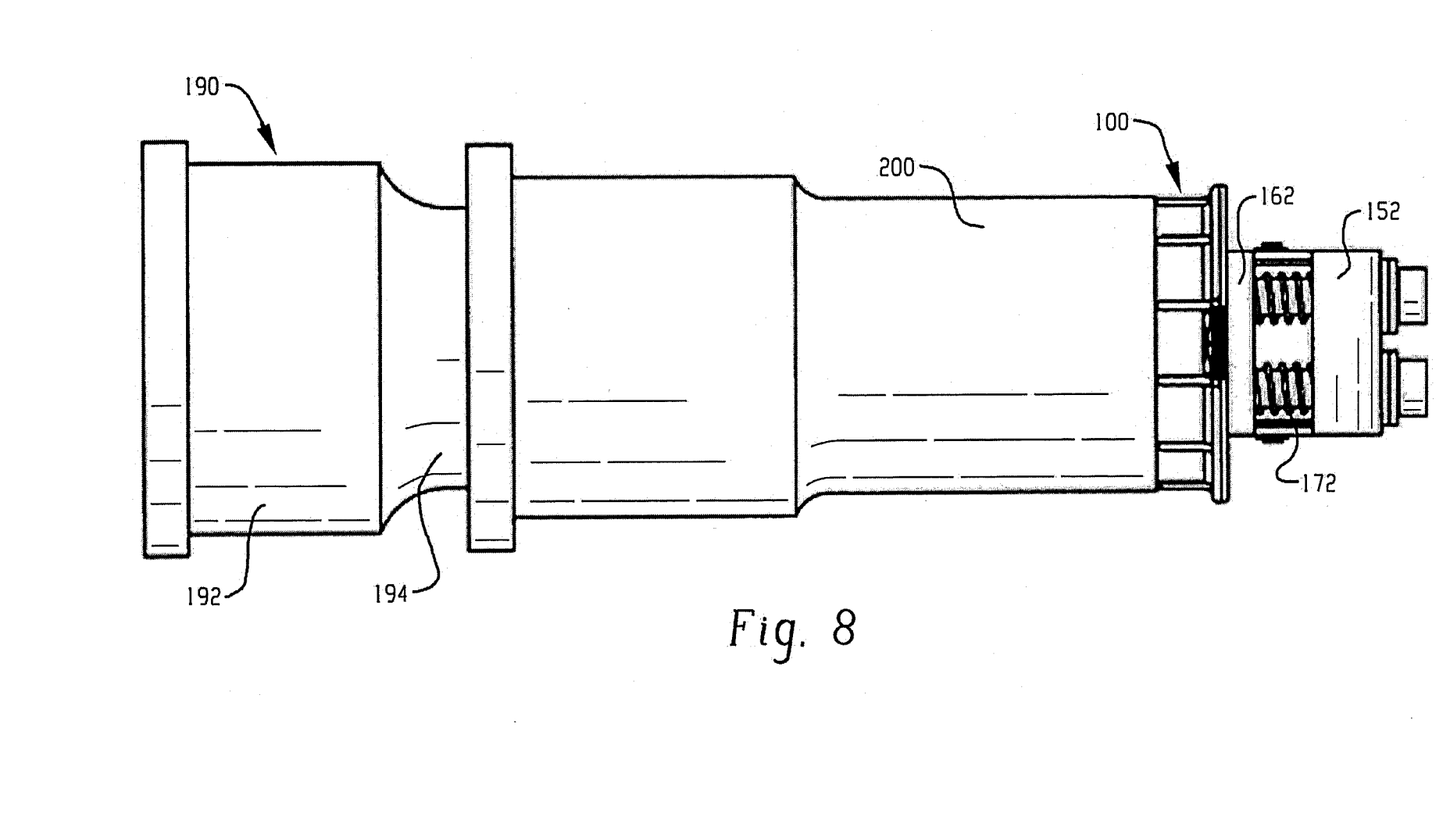
FIG. 8 is a top plan view of the thread core, stripping sleeve, cap assembly, and compliant head assembly.

Once a cap assembly 100 has been molded, a lid 104 is engaged by a roller 154 as the arm 152 extends into engagement with the lid 104 and pivots or partially rotates the lid about the hinge 106 of the cap assembly 100. More particular details of the arm 152 are shown in FIGS. 4-7. In addition to the roller 154 at a first or distal end of the arm 152, a compliant head assembly 160 is mounted on the arm. Specifically, the compliant head assembly 160 includes a second member or plate 162 disposed inwardly of the roller 154 and mounted for limited movement relative to the arm 152. In a preferred arrangement, the plate 162 has a generally rectangular conformation, although one skilled in the art will appreciate that it can adopt other configurations. The plate 162 is biased outwardly away from the arm 152. Specifically, a biasing member 170 is provided and in one preferred arrangement includes four individual springs 172 each received around a respective pin 174. Each pin 174 has a first end secured to the plate 162 and extends through a respective opening 176 in the arm 152. An enlarged head 178 at a second end of each pin 174 abuts against the surface of the arm 152 opposite the compliant head assembly 160, and thus the coil springs 172 urge the plate 162 away from the arm 152 and toward the mold cavity. In its outwardly biased position as shown in FIGS. 5-7, an outer surface of the plate 162 that faces the mold cavity is substantially aligned with a tangent to the outer surface of roller 154.

With continued reference to FIGS. 4-7, and additional reference to FIGS. 8-13, further details of the stripping action and the operation of compliant head assembly 160 will be described. Specifically, a thread core 190 has an enlarged portion 192 at a first end and a narrower, second end 194 (FIGS. 12-13) that includes a thread forming detail 196. In addition, an elongated hollow stripping sleeve 200 is received over the second end 194 of the thread core 190. The stripping sleeve 200 has a terminal end 202 dimensioned to engage the base 102 of the cap preferably along the entire circumference of the base. Thus, as the stripping sleeve 200 moves (rightwardly as shown) relative to the thread core 190, the cap assembly 100 (and particularly the radially inwardly extending formed thread portions 130) is removed over the thread detail 196 of the thread core. This linear stripping action distorts the molded base and typically distorts the base of the cap assembly 100 to such an extent that the lid 104, if closed on the base 102, would open. It is for this reason that the cap assembly 100 is typically removed entirely from the mold and a second tool or robot (not shown) used to fold the lid 104 into a closed position over the cap base 102. Here however, the compliant head assembly 160 engages the lid and the biasing springs 172 urge the plate 162, the lid 104, and the cap base 102 toward the mold cavity, i.e., in a direction generally opposite that of the motion of the stripping sleeve 200 relative to the thread core 190.

Figure 9:
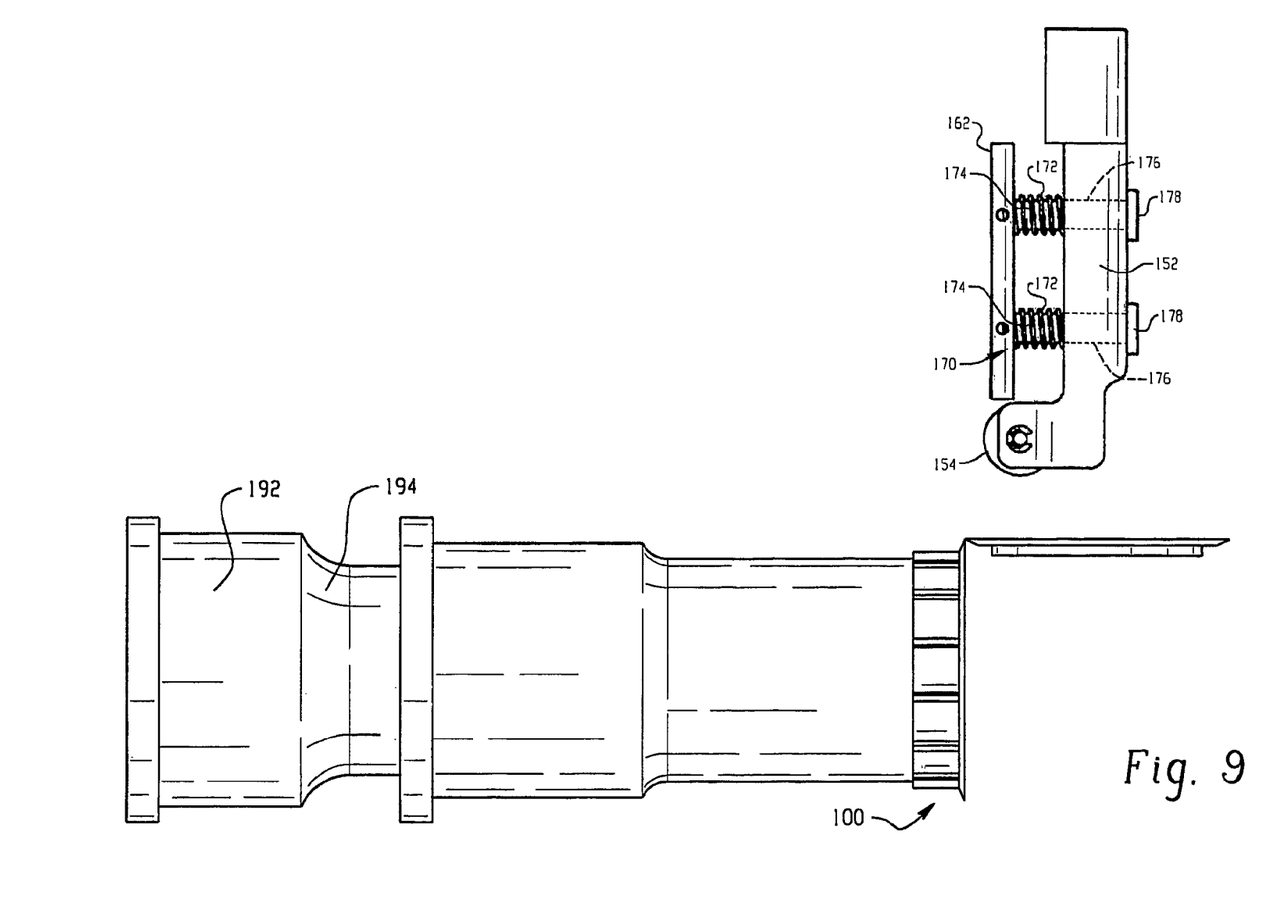
FIG. 9 is an elevational view of the thread core, stripping sleeve, cap assembly, and compliant head assembly advancing toward the cap assembly in a lid open position.
Figure 10:
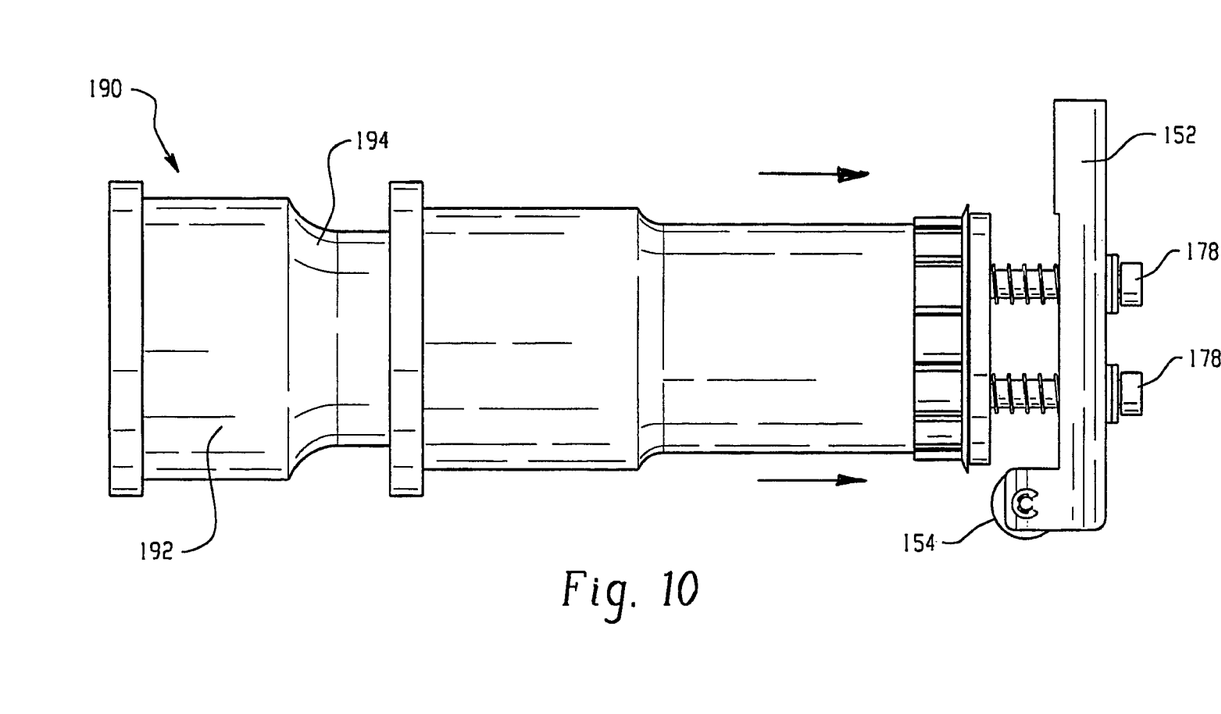
FIG. 10 is an elevational view of the thread core, stripping sleeve, cap assembly, and compliant head assembly after closing the lid.
Figure 11:
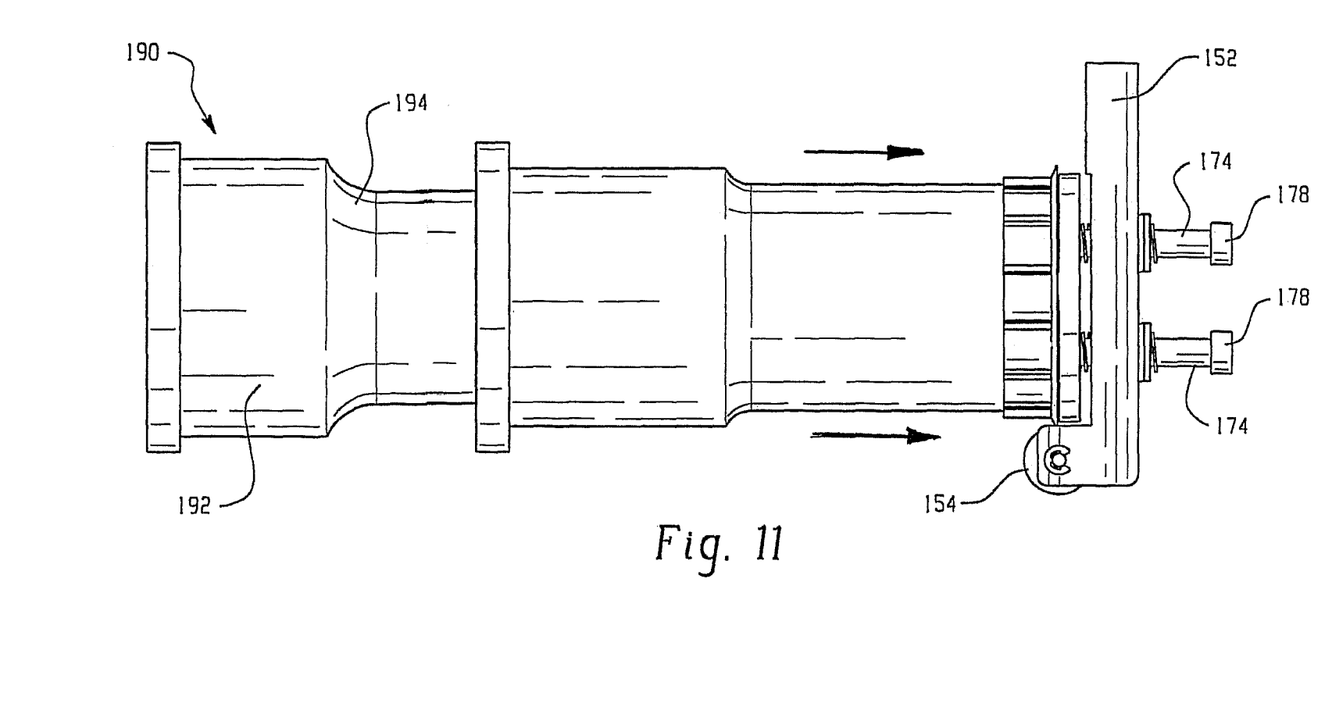
FIG. 11 is an elevational view of the thread core, stripping sleeve, cap assembly, and compliant head assembly as the stripping sleeve strips the closed cap assembly from the thread core.
Figure 12:
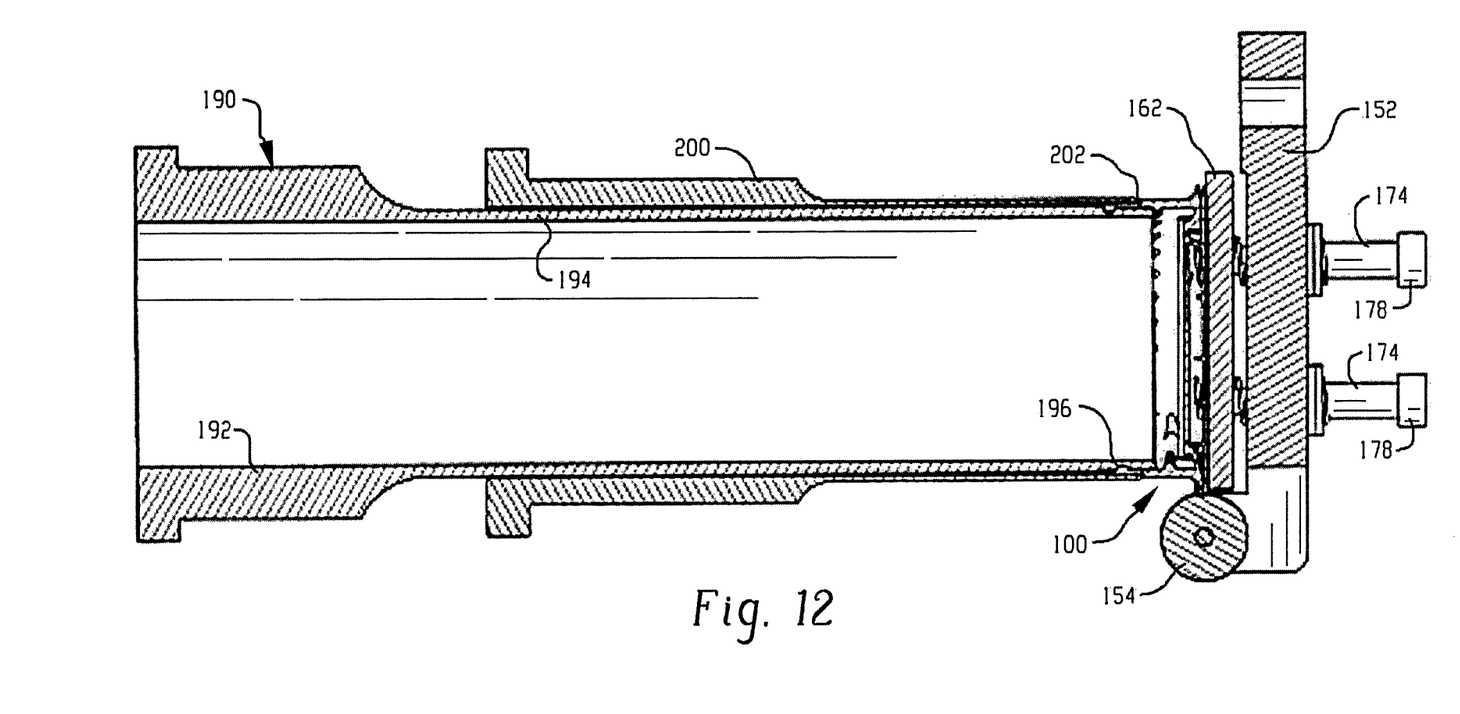
FIG. 12 is a cross-sectional view of FIG. 11.
Figure 13:
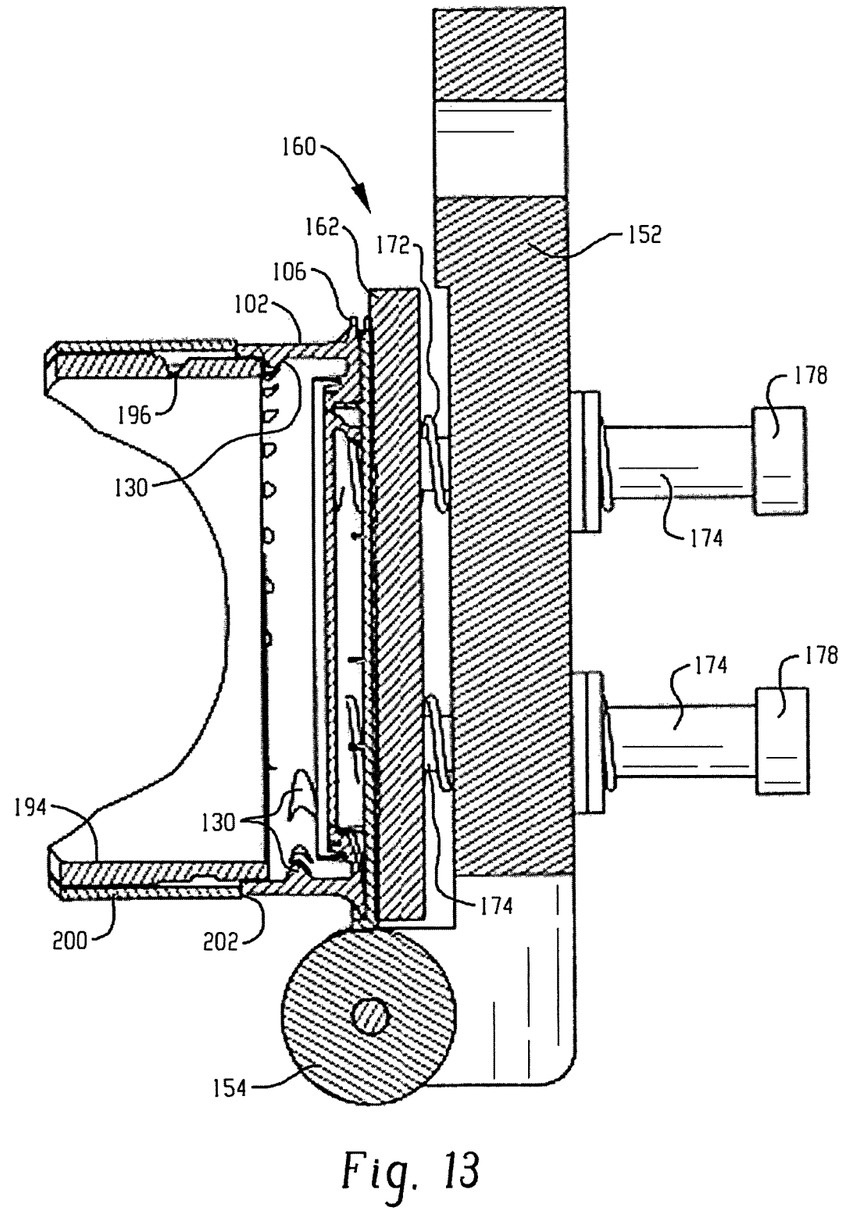
FIG. 13 is an enlarged view illustrating stripping of the closed cap assembly from the thread core.

FIGS. 9-10 illustrate the progressive movement of the arm and roller 154 to close the lid onto the base. Once the roller 154 has traversed the surface of the lid 104 (FIG. 10), the plate 162 (as urged by the biasing springs 172 away from the arm 152) keeps the lid in a closed position during the stripping of the cap assembly 100 off of the thread core 190. Thus as particularly illustrated in FIGS. 11, 12, and 13, the springs 172 are compressed as the plate 162 is urged toward the arm 152 (rightwardly as shown) as the stripping sleeve 200 advances the cap assembly 100 off the thread core 190. Once the cap assembly 100 is stripped from the thread core 190, the closed cap assembly is collected in handling equipment.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A mold head assembly for maintaining a lid in a closed position relative to a cap body while a molded cap assembly is removed from a threaded core in a mold cavity, the mold head assembly comprising:
   a first member having a roller rotatably mounted on the first member and configured to roll across a surface of the associated molded cap assembly;
   a second member configured for receipt opposite the associated mold cap assembly and mounted to the first member for limited relative movement therebetween; and
   a biasing member interposed between the first and second members for urging the second member toward the mold cavity along a first axis; and
   a thread core and a stripping sleeve received over the thread core for selective axial movement relative thereto that advances an associated mold cap assembly in a non-rotational, axial direction over the thread core while the biasing member urges the second member toward the mold cavity, wherein the relative axial movement of the thread core and the stripping sleeve is parallel to the first axis.

2. The mold head assembly of claim 1 wherein the biasing member includes individual spaced apart springs.

3. The mold head assembly of claim 2 further wherein each spring is received around a respective pin.

4. The mold head assembly of claim 3 wherein the pins are secured to the second member adjacent first ends and each include a stop member adjacent a second end thereof for selective abutting engagement with the first member.

5. The mold assembly of claim 4 wherein the pins extend through the first member and the spring s are interposed between the first and second members.

6. The mold head assembly of claim 1 wherein a tangent to an outer surface of the roller and an outwardly facing surface of the second member are substantially coplanar.

7. The mold head assembly of claim 1 wherein the biasing springs urge the second member in a direction opposite the axial direction.

8. The mold head assembly of claim 1 wherein the first member is an arm having the roller mounted adjacent a first end of the arm, and the second member is a plate urged toward the mold cavity by plural, spaced apart springs.

* * * * *